United States Patent
Kubo

(10) Patent No.: US 6,958,779 B2
(45) Date of Patent: Oct. 25, 2005

(54) DIGITAL CAMERA

(75) Inventor: Hiroaki Kubo, Muko (JP)

(73) Assignee: Minolta Co., Ltd., Osaka (JP)

( * ) Notice: Subject to any disclaimer, the term of this patent is extended or adjusted under 35 U.S.C. 154(b) by 808 days.

(21) Appl. No.: 09/732,336

(22) Filed: Dec. 7, 2000

(65) Prior Publication Data

US 2001/0003466 A1 Jun. 14, 2001

(30) Foreign Application Priority Data

Dec. 13, 1999 (JP) ............................................ 11-352984

(51) Int. Cl.⁷ .............................................. H04V 5/222
(52) U.S. Cl. ...................................... 348/371; 396/159
(58) Field of Search .............................. 348/343, 344, 348/366, 370, 371, 362, 363, 364, 335, 341; 396/162, 166, 159, 161, 354, 358, 111, 155

(56) References Cited

U.S. PATENT DOCUMENTS

| | | | | |
|---|---|---|---|---|
| 4,677,489 A | * | 6/1987 | Nishimura et al. | 348/366 |
| 4,757,387 A | * | 7/1988 | Saito | 348/342 |
| 5,550,587 A | * | 8/1996 | Miyadera | 348/223.1 |
| 5,576,798 A | * | 11/1996 | Takagi | 396/159 |
| 6,536,960 B2 | * | 3/2003 | Kubo et al. | 396/355 |
| 6,661,460 B1 | * | 12/2003 | Higuchi | 348/333.08 |

FOREIGN PATENT DOCUMENTS

| | | | | |
|---|---|---|---|---|
| JP | 8-254751 | | 10/1996 | |
| JP | 08254751 A | * | 10/1996 | ............ G03B/19/12 |
| JP | 08266478 A | * | 10/1996 | ............ A61B/3/14 |
| JP | 09054351 A | * | 2/1997 | ............ G03B/7/16 |
| JP | 09-138464 | | 5/1997 | |
| JP | 11-183978 | | 7/1999 | |

* cited by examiner

*Primary Examiner*—Wendy R. Garber
*Assistant Examiner*—Timothy J. Henn
(74) *Attorney, Agent, or Firm*—Sidley Austin Brown & Wood LLP

(57) ABSTRACT

A digital camera has a half mirror that splits the optical path from a taking lens to the image-sensing device and an optical viewfinder that offers the light reflected from the half mirror as a visible image. Inside the optical viewfinder, a photometric device is disposed. The amount of light measured by the photometric device is used for exposure control in ambient-light shooting and for automatic light adjustment in flash shooting.

8 Claims, 4 Drawing Sheets

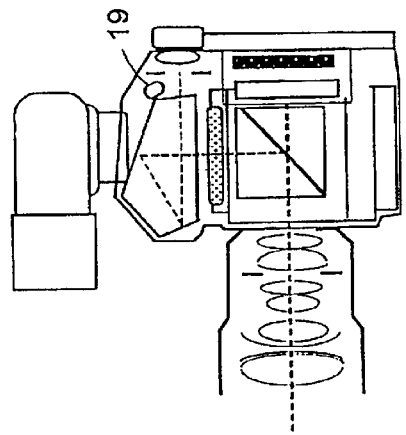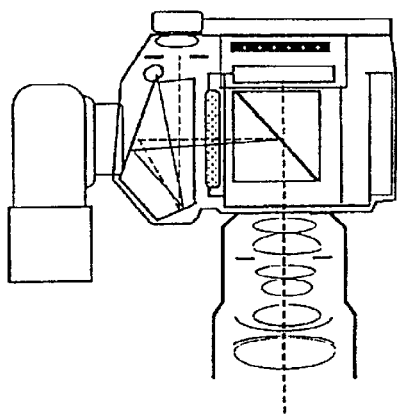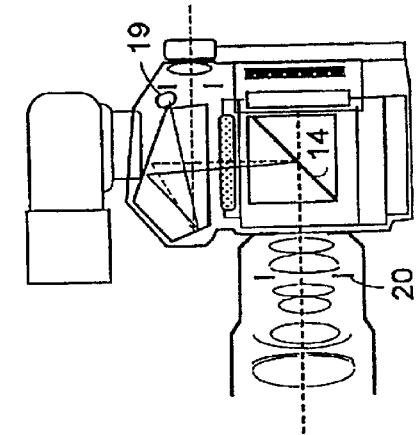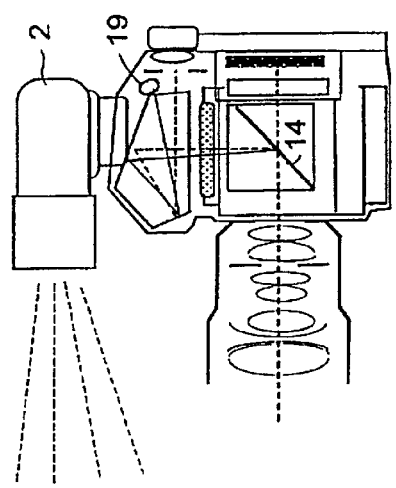

DIGITAL CAMERA

This application is based on application No. H11-352984 filed in Japan on Dec. 13, 1999, the entire contents of which are hereby incorporated by reference.

BACKGROUND OF THE INVENTION

1. Field of the Invention

The present invention relates to a digital camera of a single-lens-reflex type, and more particularly to a digital camera that automatically adjusts the amount of light in flash shooting.

2. Description of the Prior Art

Generally, a digital camera is equipped with a display device such as a liquid crystal display device, and this display device is used both to display a playback of an image shot and stored previously and to display an image just being shot. This enables the user to determine picture composition and confirm focus condition while viewing a "live view", i.e. the image just being shot, that is displayed on the display device. Thus, the display device functions as a video viewfinder.

Some digital cameras are additionally equipped with an optical viewfinder. Digital cameras equipped with an optical viewfinder divide into a separate type, in which light is introduced to the viewfinder without being passed through a taking lens, and a single-lens-reflex (SLR) type, in which the light having passed through a taking lens is reflected so as to be introduced to the viewfinder. Whereas the separate type suffers parallax between the viewfinder and the taking lens, the SLR type has the advantage of intrinsically being free of parallax.

The SLR type requires a prism to be disposed in the optical path from the taking lens to an image-sensing device so as to reflect a part and transmit the other part of the light having passed through the taking lens, and requires also a pentaprism for directing the reflected light to the eye of the user in such a way as to permit the user to observe an erect image. In this arrangement, the optical viewfinder and the video viewfinder can be used at the same time. However, only part of the light having passed through the taking lens reaches the image-sensing device, and therefore light is used inefficiently in shooting.

As is well known, in an SLR-type camera that shoots by exposure of silver-halide film, it has been customary to dispose a total-reflection mirror obliquely in the optical path from the taking lens to the film in such a way that the mirror can be rotated out of the optical path. Until immediately before shooting, i.e. exposure of film, the mirror is kept in the optical path so that the incoming light is reflected toward the pentaprism. Only at the moment of shooting is the mirror retracted out of the optical path so that the incoming light is directed to the film, and, immediately after shooting, the mirror is brought back in the optical path. This type of mirror is called a quick-return mirror.

Digital cameras equipped with such a quick-return mirror are already in practical use, producing bright images despite using an optical viewfinder. However, in this arrangement, while the total-reflection mirror is placed in the optical path to permit the use of the optical viewfinder, no light reaches the image-sensing device, and thus the display device cannot be used as a viewfinder.

To overcome this inconvenience, digital cameras equipped with a half mirror as a quick-return mirror have been proposed. Whether the half mirror is placed in or retracted out of the optical path, the incoming light reaches the image-sensing device, and therefore both shooting and display are possible at any time. While the half mirror is placed in the optical path, the optical viewfinder can be used as well. On the other hand, when an image to be recorded is shot, the half mirror is retracted out of the optical path so that all the light from the taking lens is used for shooting.

Generally, irrespective of the type of camera, when shooting is attempted in so low light that bright images are unlikely to be obtained, flash is used so that the subject is illuminated to proper brightness with illumination light emitted from a flash device. To permit proper adjustment of the amount of illumination light, some SLR-type cameras that shoot by exposure of silver-halide film adopt control called automatic light adjustment. Specifically, the amount of illumination light that reaches the film during shooting is measured, and emission of the illumination light is stopped when the measured amount has reached a predetermined value. This control works excellently to permit the subject to be illuminated to proper brightness.

Such automatic light adjustment requires the use of a photometric device, which is usually disposed by the side of the optical path from the talking lens to the film in such a way as to face the film obliquely, so that the photometric device measures the amount of light reflected from the film. Since the film reflects light dispersively, disposing the photometric device in this way suffices to enable it to measure the amount of reflected light.

On the other hand, in a digital camera, the image-sensing device itself outputs a signal representing the amount of light received, and therefore exposure of the image-sensing device can be controlled on the basis of that signal. In fact, in ambient-light shooting involving no emission of illumination light, on the basis of the output of the image-sensing device, the aperture value and the exposure time (electronic shutter speed) to be used in succeeding shooting are determined. However, since it is only after the completion of shooting of the image of a frame that the image-sensing device outputs the signal corresponding to that frame, it is impossible to use the image-sensing device as a photometric device for the purpose of automatic light adjustment.

For this reason, in a digital camera, first, an image is shot with preliminarily emitted illumination light and, on the basis of the result of this shooting, the amount of illumination light to be emitted is determined. It is only then that an image to be recorded is shot with emission of the thus determined amount of illumination light. However, this control has the disadvantage of requiring too much time after the user has operated the release button to command recording of an image until the image to be recorded starts to be shot.

Some might expect that, even in a digital camera, if it is additionally equipped with a photometric device separate from an image-sensing device, it would be possible to realize automatic light adjustment that permits accurate adjustment of the amount of light with quick response. In reality, however, since the image-sensing device used in a digital camera hardly reflects light dispersively, it is meaningless to dispose the photometric device to face the image-sensing device obliquely. Also meaningless is to dispose the photometric device to face the image-sensing device squarely, because then the photometric device obstructs part of the light traveling from the taking lens to the image-sensing device.

On the other hand, in an SLR-type digital camera, as described above, the optical path is split by a semi-transmissive optical element such as a prism or half-mirror so that the light reflected from that optical element is directed to the optical viewfinder. However, no arrangement has conventionally been known that uses this reflected light for any other purpose than to offer a viewfinder image.

SUMMARY OF THE INVENTION

An object of the present invention is to provide an SLR-type digital camera that can automatically adjust the amount of light in flash shooting.

To achieve the above object, according to one aspect of the present invention, a digital camera is provided with: a taking lens; an image-sensing device for shooting an image by receiving light from the taking lens; an optical element, disposed retractably in the optical path from the taking lens to the image-sensing device, for reflecting part of the light from the taking lens; a photometric device for measuring the amount of light reflected from the optical element; a controller that, during shooting, makes an illumination device start emitting illumination light and then makes the illumination device stop emitting the illumination light when the amount of light measured by the photometric device has reached a predetermined value; a selector that selects either a first mode in which shooting is performed without emission of the illumination light by the illumination device and a second mode in which shooting is performed with emission of the illumination light by the illumination device; and a driver that retracts the optical element out of the optical path during shooting when the first mode is selected and that keeps the optical element in the optical path during shooting when the second mode is selected.

This digital camera performs shooting without emission of the illumination light in the first mode, and performs shooting with flash, i.e. with emission of the illumination light, and with automatic light adjustment as well in the second mode. The photometric device used for automatic light adjustment is disposed in the optical path of the light reflected from the optical element, and thus it never obstructs the light having passed through the optical element and traveling toward the image sensing device. Moreover, since there is no need to measure the amount of light reflected from the image-sensing device, no consideration needs to be given to the fact that the image-sensing device does not reflect light dispersively, and thus the photometric device can be disposed at any convenient position in the optical path of the light reflected from the optical element. Furthermore, in the first mode, the optical element is retracted out of the optical path during shooting, and therefore all the light having passed through the taking lens can be used for shooting.

The illumination device may be built into the digital camera, or may be, as a separate unit, externally connected to the digital camera.

The gain of the output of the image-sensing device may be made variable so that the gain is set to differ between in the first and second modes. Here, it is preferable that the gain in the second mode be approximately equal to the gain in the first mode multiplied by the reciprocal of the transmittance of the optical element. In flash shooting, keeping the optical element in the optical path causes the amount of light reaching the image-sensing device to lower according to the transmittance of the optical element. Therefore, if the predetermined value that determines when to stop the emission of the illumination light is determined on the basis of the total amount of light passing through the taking lens, the actually shot image will be dimmer than it should be. This can be solved by enhancing the sensitivity of the image-sensing device by a factor of the reciprocal of the transmittance of the optical element when flash shooting is performed with the optical element kept in the optical path, because then, even if the predetermined value is determined on the basis of the total amount of light passing through the taking lens, proper automatic light adjustment is possible without fail.

This digital camera may be additionally equipped with a viewfinder that offers a visible image by receiving the light reflected from the optical element. This makes it possible to present an optical image identical with the image shot by the image-sensing device without parallax.

BRIEF DESCRIPTION OF THE DRAWINGS

This and other objects and features of the present invention will become clear from the following description, taken in conjunction with the preferred embodiments with reference to the accompanying drawings in which:

FIGS. 5A to 5D are sectional views of the digital camera shown in FIG. 1, as observed during shooting in the flash mode;

DESCRIPTION OF THE PREFERRED EMBODIMENTS

Figure 1:
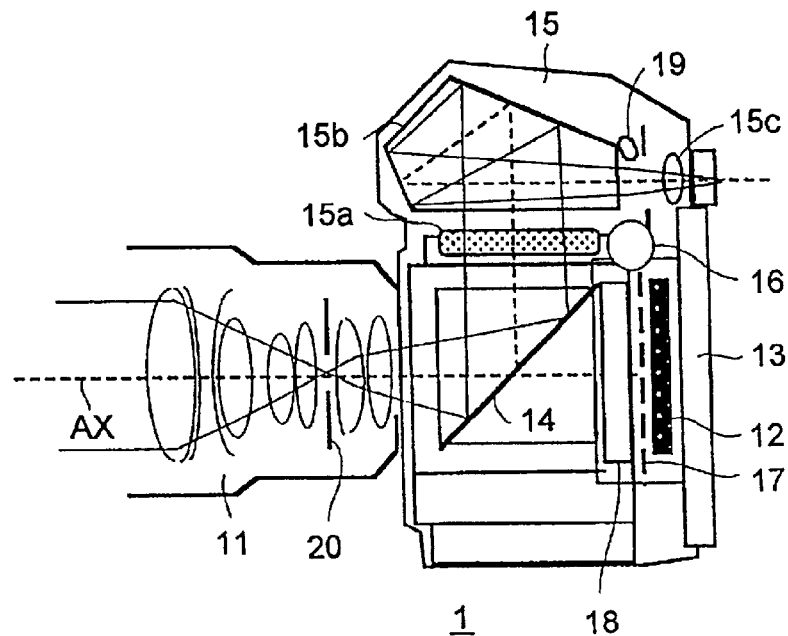
FIG. 1 is a sectional view showing the optical construction of a digital camera embodying the invention.
Figure 2:
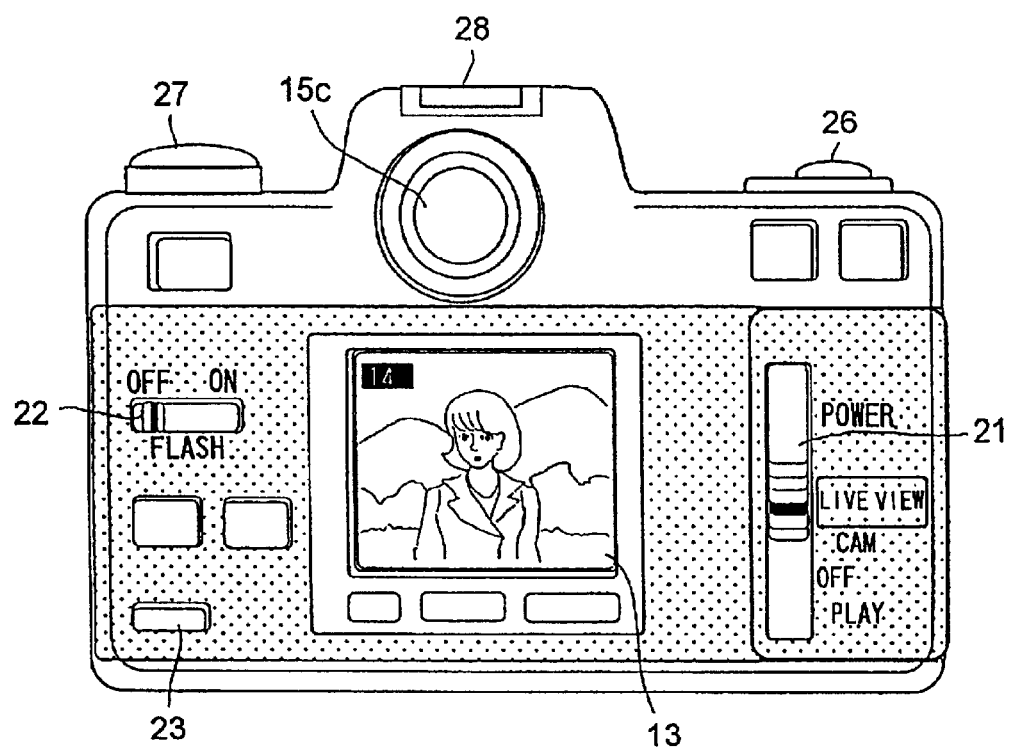
FIG. 2 is a rear view of the digital camera shown in FIG. 1.

Hereinafter, an embodiment of the present invention will be described with reference to the drawings. FIG. 1 and FIG. 2 are a sectional view and a rear view, respectively, of a digital camera 1 embodying the invention.

As shown in FIG. 1, the digital camera 1 has a taking lens 11, a charge-coupled device (CCD) 12 serving as an image-sensing device, a liquid crystal display (LCD) 13, a half mirror 14 serving as a semi-transmissive optical element, and an optical viewfinder 15. The taking lens 11 images the light from a subject on the light-receiving surface of the CCD 12. The CCD 12 is disposed perpendicularly to the optical axis Ax of the taking lens 11, and serves to shoot an image by converting the light from the taking lens 11 into an electric signal. The shooting of an image by the CCD 12 is performed repeatedly at substantially regular time intervals. The LCD 13 is disposed on the back of the digital camera 1, and serves to display the image shot by the CCD 12 and messages to the user.

The half mirror 14 is disposed between the taking lens 11 and the CCD 12. The half mirror 14 has, at the upper end thereof, a rotation axis, which lies perpendicular to the optical axis Ax of the taking lens 11 and about which the half mirror 14 rotates between an intercepting position, in which the half mirror 14 crosses the optical path from the talking lens 11 to the CCD 12, and a retracted position, in which the half mirror 14 is retracted out of the optical path. The half mirror 14, when in the intercepting position, crosses the optical axis Ax at 45° and, when in the retracted position, lies parallel to the optical axis Ax. The half mirror 14 is designed to have a transmittance of approximately 60%. The half mirror 14 is driven by an actuator 16 provided near the upper end thereof.

The optical viewfinder 15 is composed of a focusing screen 15a, a pentaprism 15b, and an eyepiece lens 15c. The screen 15a is disposed parallel to the optical axis Ax of the taking lens 11, and serves to image the light reflected from the half mirror 14 when the half mirror 14 is in the intercepting position. The distance from the intersection between the optical axis Ax and the half mirror 14 to the imaging surface of the screen 15a is made equal to the distance from the same intersection to the light-receiving surface of the CCD 12. Thus, these two surfaces are located at optically equivalent positions. By observing the image formed on the screen 15a through the eyepiece lens 15c and the pentaprism 15b, the user can observe an erect image equivalent to the image formed on the CCD 12.

Immediately in front of the CCD 12, a focal-plane shutter 17 is disposed that switches between a state in which light is allowed to reach the CCD 12 and a state in which light is shut off therefrom. Between the half mirror 14 and the shutter 17, a low-pass filter 18 is disposed that eliminates high-frequency components. Inside the optical viewfinder 15, a photometry device 19 is disposed that measures the amount of light from the prism 15b. The amount of light measured by the photometry device 19 is used to control the exposure of the CCD 12, and, in flash shooting, it is used also to achieve automatic light adjustment. Near the pupil of the taking lens 11, an aperture stop 20 is disposed that restricts the diameter of the light beam and thereby controls the exposure of the CCD 12.

As shown in FIG. 2, on the back of the digital camera 1 are arranged, in addition to the LCD 13, a number of switches including two slide-type switches 21 and 22 and a push-type switch 23. On the top of the digital camera 1 are arranged a release button 26, a dial 27, and a receptacle 28 that permits a flash device 2 (see FIG. 3) to be attached thereto. On each of the flash device 2 and the receptacle 28, electric contacts are provided so that the flash device 2, when attached to the receptacle 28, is electrically connected to the digital camera 1.

The switch 21 is used to turn on and off the supply of electric power and to set the operation mode. The digital camera 1 operates in a shooting mode, in which an image is shot by the CCD 12 and the shot image is recorded on a recording medium as requested by the user, or in a playback mode, in which a previously recorded image is reproduced and displayed on the LCD 13. In the shooting mode, the shooting of an image and the display of the shot image on the LCD 13 may be repeated at regular time intervals (for example, 1/30 seconds). This makes it possible to offer a "live view" display capability whereby the target subject is displayed in a form much like a moving video picture.

When the switch 21 is in a position marked "OFF", no power is supplied, and thus the digital camera 1 remains out of operation. With the switch 21 in a position marked "PLAY", the digital camera 1 operates in the playback mode. With the switch 21 in a position marked "LIVE VIEW", the digital camera 1 operates in the shooting mode with a live view, and, with the switch 21 in a position marked "CAM", the digital camera 1 operates in the shooting mode without a live view.

In addition, the digital camera 1 operates in a flash mode, in which illumination light is emitted from the flash device 2 when an image to be recorded is shot, or in an ambient-light mode, in which no illumination light is emitted. The switch 22 is used to switch between these two modes. When the switch 22 is in a position marked "ON", the digital camera 1 operates in the flash mode, and, when the switch 22 is in a position marked "OFF", the digital camera 1 operates in the ambient-light mode.

In the ambient-light mode, the half mirror 14 is operated as a quick-return mirror. That is, in this mode, until there is a request to record an image, shooting is performed with the half mirror 14 kept in the intercepting position. As soon as there is a request to record an image, the half mirror 14 is moved to the retracted position, then an image to be recorded is shot on completion of the retraction of the half mirror 14, and then, on completion of the shooting of this image, the half mirror 14 is moved back to the intercepting position. In the flash mode, irrespective of whether there is a request to record an image or not, shooting is performed with the half mirror 14 kept in the intercepting position all the time, and, as soon as there is a request to record an image, illumination light is emitted from the flash device 2.

The release button 26, when pressed halfway, produces a signal S1, and, when pressed fully, additionally produces a signal S2. The digital camera 1 adopts automatic focusing whereby the focus of the taking lens 11 is adjusted on the basis of the image shot by the CCD 12. The signal S1 requests starting of automatic focusing. The signal S1 also requests starting of calculation of the aperture value of the aperture stop 20 and the photoelectric conversion time (electronic shutter speed) of the CCD 12 on the basis of the output of the photometric device 19 in order to control the exposure of the CCD 12.

The signal S2 requests recording of the image being shot. When the signal S2 is issued, first, the aperture value and the electronic shutter speed are set at the values that have been calculated previously. In addition, in the ambient-light mode, the half mirror 14 is driven to the retracted position. Then, the image shot on completion of these operations is recorded.

The digital camera 1 uses as an image recording medium a removable memory card. An image may or may not be compressed before being recorded. The switch 23 is used to switch between compressed and non-compressed recording of images. Exposure can be controlled in an aperture-priority, shutter-priority, or program mode. The dial 27 is used to select among these modes.

Figure 3:
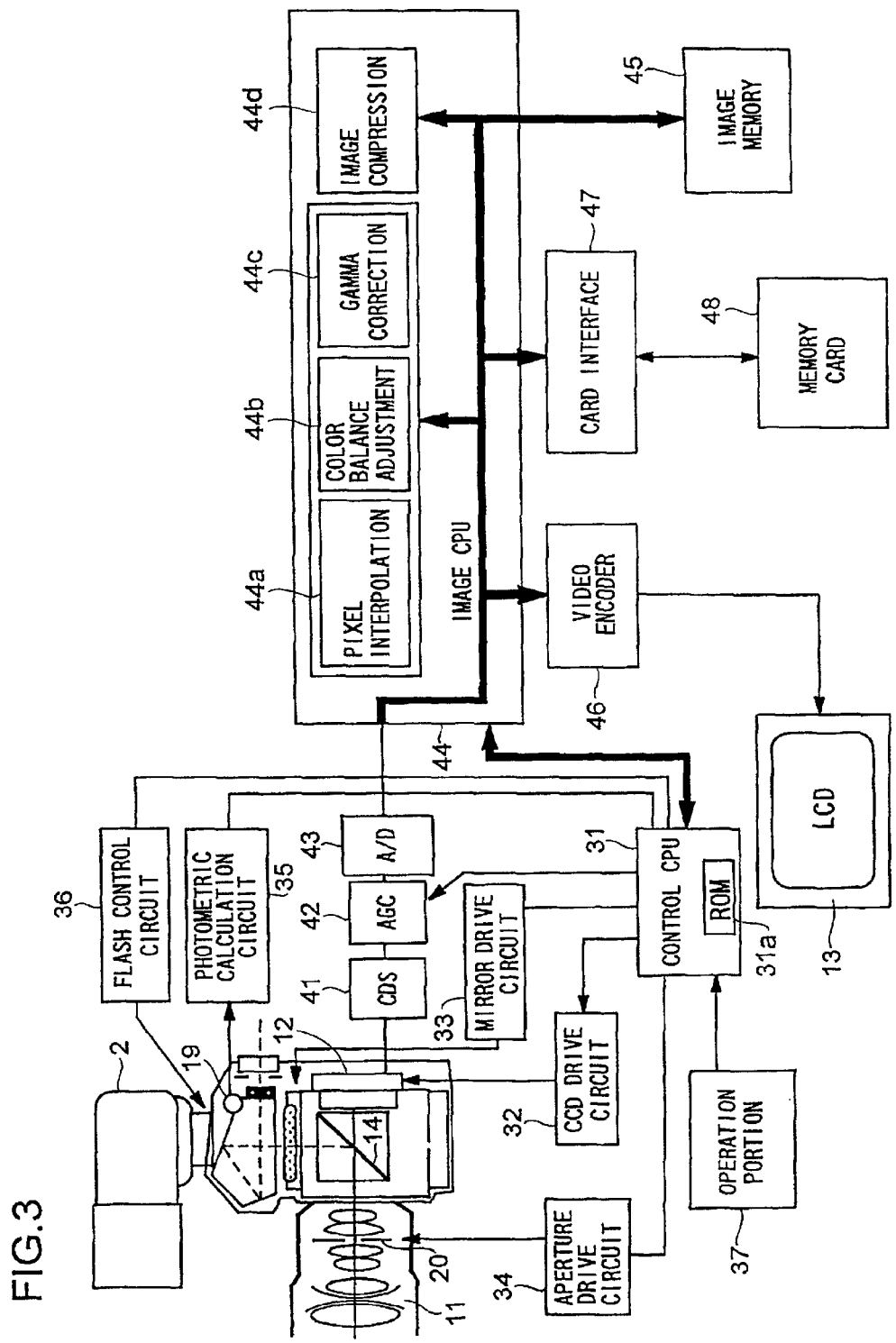
FIG. 3 is a block diagram showing the circuit configuration of the digital camera shown in FIG. 1.

FIG. 3 schematically shows the circuit configuration of the digital camera 1. The digital camera 1 has a CPU 31, a CCD driver circuit 32, a mirror driver circuit 33, an aperture driver circuit 34, a photometric calculation circuit 35, a flash control circuit 36, an operation portion 37, a CDS (correlative double sampling) circuit 41, an AGC (automatic gain control) circuit 42, an A/D converter 43, a CPU 44, an image memory 45, a video encoder 46, and a card interface 47.

The CPU 31 controls the operation of the entire digital camera 1. Hereinafter, the CPU 31 is called the control CPU. The CCD driver circuit 32 produces a clock that is used as the basis of operation timing, and feeds it to the CCD 12 so as to control the operation of the CCD 12 by instructing it to start photoelectric conversion, output the electric charges accumulated by photoelectric conversion, and the like. The mirror driver circuit 33 instructs the actuator 16 to control the movement of the half mirror 14. The aperture driver circuit 34 controls, through a driving mechanism (not shown), the aperture value (aperture diameter) of the aperture stop 20. These are controlled according to commands from the control CPU 31.

The photometric calculation circuit 35, in the ambient-light mode, feeds a signal representing the amount of light measured by the photometric device 19 to the control CPU 31. On the basis of this signal, the control CPU 31 calculates the aperture value of the aperture stop 20 and the electronic shutter speed of the CCD 12 at which they are to be set. The photometric calculation circuit 35, in flash mode, compares the amount of light measured by the photometric device 19 with a predetermined value stored in itself, and, as soon as the measured amount of light reaches the predetermined value, feeds the control CPU 31 with a signal (hereinafter called the light adjustment signal) notifying it of that fact. The predetermined value is determined on the basis of the value observed when the light having passed through the taking lens 11 directly reaches the CCD 12 without passing through the half mirror 14.

The flash control circuit 36 controls the operation of the flash device 2 by feeding it with signals that instruct it to charge electric power for light emission, start light emission, and stop light emission. When the flash mode is established, the control CPU 31 instructs the flash control circuit 36 to start charging electric power. When the signal S2 is issued, the control CPU 31 feeds the CCD drive circuit 32 with a signal that instructs it to start shooting an image to be recorded, and simultaneously feeds the flash control circuit 36 and the photometric calculation circuit 35 with signals that instruct them to start light emission and start photometry, respectively. Thereafter, on receiving the light adjustment signal from the photometric calculation circuit 35, the control CPU 31 immediately feeds the flash control circuit 36 with a signal that instructs it to stop light emission. In this way, automatic light adjustment is achieved in flash shooting.

The operation portion 37 includes various operation members such as the switches 21 to 23, the release button 26, and the dial 27, and serves to transmit the operation performed by the user to the control CPU 31.

The CDS circuit 41 reduces the noise in the analog signal output from the CCD 12, and the AGC circuit 42 adjusts, according to the gain thereof, the levels of all the signals from the CDS circuit 41. The A/D converter 43 converts the analog signal from the AGC circuit 42 into 10-bit digital signals.

The gain of the AGC circuit 42 is set by the control CPU 31. The control CPU 31 sets the gain of the AGC circuit 42 for periods in which an image to be recorded is processed in flash shooting to be equal to the gain of the AGC circuit 42 for the other periods multiplied by the reciprocal of the transmittance of the half mirror 14. That is, if the gain when shooting is performed without passing light though the half mirror 14 is G, and the transmittance of the half mirror 14 is T, then the gain Gf when flash shooting is performed is given by Gf=G/T. This compensates the sensitivity of the CCD 12 that receives a reduced amount of light when light is passed through the half mirror 14, and thereby makes proper automatic light adjustment possible. The control CPU 31 has a ROM 31a having the transmittance T or its reciprocal 1/T stored therein.

The CPU 44 processes the obtained digital signals so as to produce image data representing an image. Hereinafter, the CPU 44 is called the image CPU. The signals output from the A/D converter 43 are stored in the image memory 45 for a while. The image CPU 44 reads these signals from the image memory 45, and performs pixel interpolation, color balance adjustment, and gamma correction so as to produce image data.

Pixel interpolation 44a is performed to interpolate the signals from the three-color, i.e. R, G, and B, pixels arranged alternately on the CCD 12. Color balance adjustment 44b is performed to correct individually the gains of the interpolated three-color signals and thereby achieve correct reproduction of the colors of the subject. Gamma correction 44c is performed to subject the gain-adjusted signals to non-linear conversion and thereby obtain gradation fit for the LCD 13. The image CPU 44 stores as image data the signals having undergone these operations once again in the image memory 45.

The image CPU 44 reads the image data from the image memory 45 and feeds it to the video encoder 46. The video encoder 46 then encodes the received image data into a format complying with the NTSC system, and feeds the encoded image data to the LCD 13 to display it as an image thereon.

The memory card 48 stores the image data. The card interface 47 writes data to and reads data from the memory card 48. On receiving an instruction from the control CPU 31 in response to the signal S2, the image CPU 44 reads the image data from the image memory 45, and feeds it to the card interface 47 to record it on the memory card 48. If the control CPU 31 is requesting data compression, before the image data is recorded on the memory card 48, the image CPU 44 performs data compression 44d on the image data by a method complying with JPEG.

In the playback mode, in response to an instruction from the control CPU 31, the image CPU 44 reads the image data stored on the memory card 48 through the card interface 47, decompresses the image data if necessary, and stores it in the image memory 45. Then, the image CPU 44 reads this image data, and feeds it to the video encoder 46 to display it on the LCD 13.

Figure 4A:
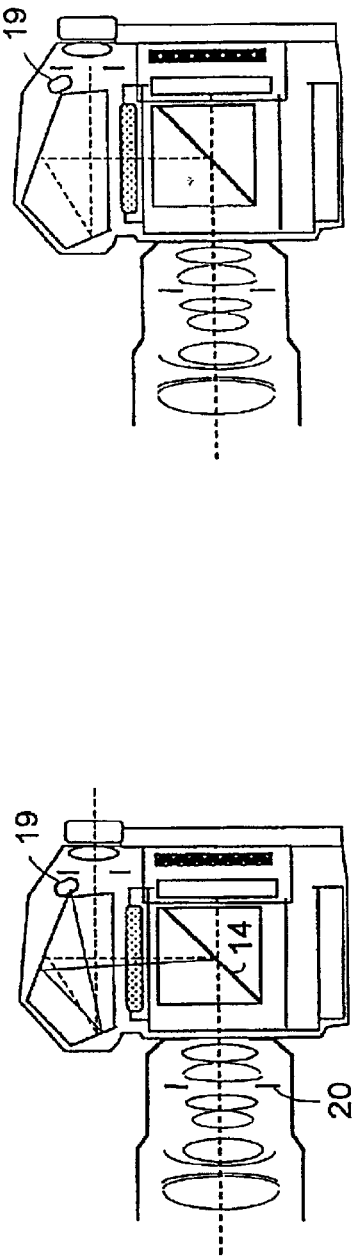
FIGS. 4A to 4D are sectional views of the digital camera shown in FIG. 1, as observed during shooting in the ambient-light mode.
Figure 4B:
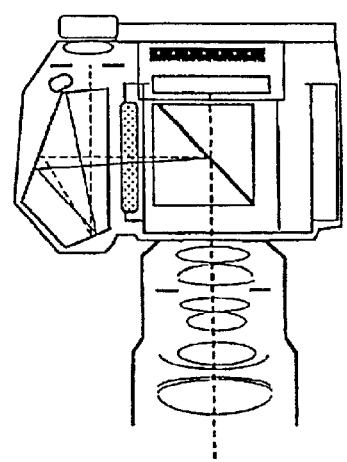

FIGS. 4A to 4D show sectional views of the digital camera 1 as observed during shooting in the ambient-light mode. FIG. 4A shows the state when the signal S1 alone is being issued. Here, the half mirror 14 is in the intercepting position, and the photometric device 19 is performing photometry. The aperture stop 20 is fully open. FIG. 4B shows the state when the signal S2 has just been issued to request recording of an image. At this point, the half mirror 14 is in the intercepting position, but subsequently it moves to the retracted position. The photometric device 19 suspends photometry.

Figure 4C:
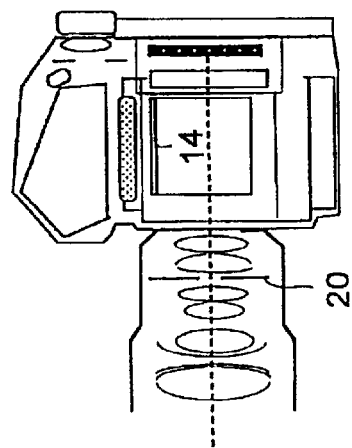
Figure 4D:
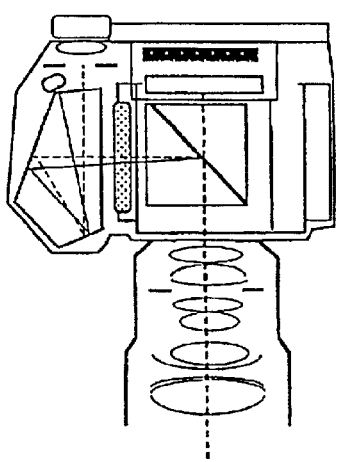

FIG. 4C shows the state when an image to be recorded is being shot. Here, the half mirror 14 is in the retracted position. The aperture stop 20 is stopped down according to the result of photometry performed in the state shown in FIG. 4A. FIG. 4D shows the state when the signal S1 is still present after completion of the shooting of the image to the recorded. Here, the half mirror 14 has moved back to the intercepting position, the photometric device 19 has restarted photometry, and the aperture stop 20 is fully open.

FIGS. 5A to 5D show sectional views of the digital camera 1 as observed during shooting in the flash mode. FIG. 5A shows the state when the signal S1 alone is being issued. FIG. 5B shows the state when the signal S2 has just been issued to request recording of an image. FIG. 5C shows the state when an image to be recorded is being shot with emission of illumination light. FIG. 5D shows the state when the signal S1 is still present after completion of the shooting of the image to the recorded. In this mode, the half mirror 14 is kept in the intercepting position all the time. The photometric device 19 suspends photometry when, as shown in FIG. 5B, the signal S2 is issued, and thereafter restarts photometry as soon as, as shown in FIG. 5C, an image to be recorded starts being shot. Thus, the photometric device 19 is used for light adjustment.

In this way, in shooting in the flash mode, keeping the half mirror 14 in the optical path eliminates the need to move the half mirror 14 to the retracted position. This makes it possible to shoot quickly an image to be recorded in response to the signal S2. On the other hand, in ambient-light shooting, moving the half mirror 14 to the retracted position makes it possible to use all the light having passed through the taking lens 11 for the shooting of an image to be recorded.

The embodiment described specifically above uses a half mirror as a semi-transmissive optical element, and operates it as a quick-return mirror. However, the present invention, according to which a photometric device for light adjustment is disposed in the optical path of the light reflected from that optical element, applies also in arrangements in which a prism serving as a semi-transmissive optical element is disposed in a fixed position. The photometric device may be disposed anywhere in the optical path of the light reflected from the semi-transmissive optical element. However, it is preferable that, as in the embodiment described specifically above, the photometric device be disposed at a position where it receives light after being imaged on the focusing screen. This makes it easy to prevent the viewfinder image from being obstructed by the photometric device, and in addition permits effective use of light that does not eventually reach the user's eye.

The embodiment described specifically above uses a flash device of a type that is detachably attached to the digital camera. However, the flash device may be of a type that is built in the digital camera. It is also possible to use a flash device that is placed away from the digital camera and connected thereto with a cable or the like.

Obviously, many modifications and variations of the present invention are possible in light of the above teachings. It is therefore to be understood that within the scope of the appended claims, the invention may be practiced other than as specifically described.

What is claimed is:

1. A digital camera comprising:
   a taking lens;
   an image-sensing device for shooting an image by receiving light from the taking lens;
   an optical element, disposed retractably in an optical path from the taking lens to the image-sensing device, for reflecting part of the light from the taking lens;
   a photometric device for measuring an amount of light reflected from the optical element;
   a controller that, during shooting, makes an illumination device start emitting illumination light and then makes the illumination device stop emitting the illumination light when the amount of light measured by the photometric device has reached a predetermined value;
   a selector that selects either a first mode in which shooting is performed without emission of the illumination light by the illumination device and a second mode in which shooting is performed with emission of the illumination light by the illumination device; and
   a driver that retracts the optical element out of the optical path during shooting when the first mode is selected and that keeps the optical element in the optical path during shooting when the second mode is selected.

2. A digital camera as claimed in claim 1, wherein the illumination device is built in or externally connected to the digital camera.

3. A digital camera as claimed in claim 1, wherein the optical element is a half mirror.

4. A digital camera as claimed in claim 1, further comprising:
   a gain controller that adjusts a gain of an output of the image-sensing device in such a way that the gain differs between the first and second modes.

5. A digital camera as claimed in claim 4, wherein the gain controller sets the gain in the second mode to be approximately equal to the gain in the first mode multiplied by a reciprocal of a transmittance of the optical element.

6. A digital camera as claimed in claim 1, further comprising:
   a viewfinder that offers a visible image by receiving the light reflected from the optical element.

7. A method for controlling a digital camera including an optical element that is disposed retractably in an optical path from a taking lens to an image-sensing device and that reflects part of the light from the taking lens, comprising:
   a step of selecting either a first mode in which shooting is performed without emission of illumination light by an illumination device and a second mode in which shooting is performed with emission of the illumination light by the illumination device;
   a step of, when the first mode is selected, retracting the optical element out of the optical path during shooting; and
   a step of, when the second mode is selected, keeping the optical element in the optical path during shooting, measuring an amount of light reflected from the optical element, and stopping emission of the illumination light as soon as the measured amount of light reaches a predetermined value.

8. A method for controlling a digital camera as claimed in claim 7, further comprising:
   a step of setting a gain of an output of the image-sensing device in such a way that the gain differs between the first and second modes.

* * * * *